US012673536B2

(12) United States Patent
Kwak et al.

(10) Patent No.:  US 12,673,536 B2
(45) Date of Patent:  Jul. 7, 2026

(54) ELECTRIC COMPRESSOR FOR VEHICLE AND HEAT EXCHANGER MODULE INCLUDING THE SAME

(71) Applicant: Hanon Systems, Daejeon (KR)

(72) Inventors: Jung Myung Kwak, Daejeon (KR); Jun Sig Choi, Daejeon (KR); Yong Hee Kim, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 66 days.

(21) Appl. No.: 18/707,808

(22) PCT Filed: Dec. 6, 2022

(86) PCT No.: PCT/KR2022/019671
§ 371 (c)(1),
(2) Date: May 6, 2024

(87) PCT Pub. No.: WO2023/132487
PCT Pub. Date: Jul. 13, 2023

(65) Prior Publication Data
US 2025/0010692 A1   Jan. 9, 2025

(30) Foreign Application Priority Data

Jan. 6, 2022   (KR) ........................ 10-2022-0002229

(51) Int. Cl.
*B60H 1/32*       (2006.01)
(52) U.S. Cl.
CPC ......... *B60H 1/3229* (2013.01); *B60H 1/3223* (2013.01); *B60H 1/3227* (2013.01)

(58) Field of Classification Search
CPC .. B60H 1/3229; B60H 1/3223; B60H 1/3227; B60H 1/00542; F25B 31/02; F25B 2400/077
See application file for complete search history.

(56) References Cited

U.S. PATENT DOCUMENTS 4,305,260 A * 12/1981 Backlund ................ F25B 30/02
                                                          62/260
2003/0200761 A1* 10/2003 Funahashi ........... F04C 29/0085
                                                          62/228.4

(Continued)

FOREIGN PATENT DOCUMENTS

EP        1993893 B1    5/2010
KR    101643864 B1    7/2016

(Continued)

OTHER PUBLICATIONS

WO-2006070558-A1 Translation (Year: 2006).*

*Primary Examiner* — David J Teitelbaum
(74) *Attorney, Agent, or Firm* — Shumaker, Loop & Kendrick, LLP; James D. Miller

(57)              ABSTRACT

An electric compressor and a heat exchanger module including the same. The heat exchanger module includes heat exchanger components, a manifold, a bracket mounting the heat exchanger components and the manifold, and an electric compressor. Further, the heat exchanger module may perform cooling through heat exchange by separating an inverter module coupled to a compressor and attaching the separated inverter module to a chiller in which a working fluid at a low temperature flows.

17 Claims, 9 Drawing Sheets

(56) References Cited

U.S. PATENT DOCUMENTS

| | | | | |
|---|---|---|---|---|
| 2015/0338134 A1 * | 11/2015 | Taniguchi | .............. | F25B 13/00 |
| | | | | 62/324.1 |
| 2019/0039440 A1 * | 2/2019 | Calderone | ........... | B60K 7/0007 |
| 2019/0381856 A1 * | 12/2019 | Bae | ................... | B60H 1/00592 |

FOREIGN PATENT DOCUMENTS

| | | | | | |
|---|---|---|---|---|---|
| KR | 20180085958 A | | 7/2018 | | |
| KR | 20180095280 A | | 8/2018 | | |
| KR | 20190002878 A | * | 1/2019 | ........ | B60H 1/32284 |
| WO | WO-2006070558 A1 | * | 7/2006 | ........ | B60H 1/00535 |

* cited by examiner

Fig. 15

ELECTRIC COMPRESSOR FOR VEHICLE AND HEAT EXCHANGER MODULE INCLUDING THE SAME

CROSS REFERENCE TO RELATED PATENT APPLICATIONS

This is a U.S. national phase patent application of PCT/KR2022/019671 filed Dec. 6, 2022 which claims the benefit of and priority to Korean Patent Application No. 10-2022-0002229, filed on Jan. 6, 2022, the entire contents of each of which are incorporated herein by reference.

TECHNICAL FIELD

The present disclosure relates to a heat exchanger module provided in an environmentally friendly vehicle, and more particularly, to a vehicular electric compressor and a heat exchanger module including the same with improved cooling efficiency.

BACKGROUND ART

There is an increasing tendency that electric vehicles etc. are supplied as environmentally friendly vehicles because of the environmental issues of the combustion engine vehicles. However, the passenger compartment of the conventional combustion engine vehicle may be heated with a waste heat of the engine of the combustion engine vehicle, therefore, the separate heating may be conveniently conducted.

Recently, various environmentally friendly vehicles have been released in consideration of the environment, compared to the combustion engine vehicles. For example, research and development of the electric vehicles (EV) are robustly conducted since the electric vehicles are the most likely alternative which may solve problems of air pollution caused by the automobiles and the energy issues.

The electric vehicles are classified into fuel cell powered vehicles configured to be driven by the electricity generated by the chemical change, and a secondary cell or a battery cell powered vehicle configured to obtain electricity through power of the battery or by driving an AC or DC motor, and another type of vehicles configured to obtain power by a method not described above may be included as well.

In the electric vehicle, a large amount of heat is generated if the electricity is supplied to a driving part of the vehicle. In addition, in the electric vehicles, if heat generation occurs, a resistance increases together with the heat generation, thereby the heat discharge continues and the charging efficiency and the discharging efficiency decrease, while lifespan of the electric vehicle is reduced. Therefore, a coolant circulation loop is installed to properly cool the heat.

In addition, on the inside of in the electric vehicle, a refrigerant circulation loop for cooling and heating of a passenger compartment and an air circulation loop etc. for ventilation of the internal air are installed, in a similar manner as that of the conventional combustion vehicle.

As such, in the electric vehicle, various types of valve devices, which can distribute and control a fluid flow in the air circulation circuit and a refrigerant circulation loop etc. as well as in the coolant circulation loop of the battery described above, are installed.

Meanwhile, because of the vehicle electrification, there is a new need for a heat management with respect to the electric equipment such as a high voltage battery, a motor, and the like as well as the internal space of the vehicle. That is, in case of the electric vehicle, the needs for the air conditioning for the internal space, the battery, and the electric equipment, respectively, are all different, and a technology capable of addressing the above each independently, and allowing effective cooperation among the different needs for the air conditioning is required so as to reduce the energy to the maximum.

The cooling system for the electric component is formed of a structure in which an electric equipment, an actuator, a HSG (hybrid start and generator) and the like are cooled by means of a coolant, and in a cold weather condition, the cooling system for the electric component is configured to increase the temperature of the battery by allowing the coolant to bypass the radiator through the bypass circuit, and at the same time, allowing the coolant to pass through the battery using a waste heat of the PE part (power electronics).

The electronic cooling system of the environmentally friendly vehicle must meet various purposes such as heating, cooling, and withdrawing waste heat from a plurality of heat exchange components.

However, problems may occur, such as limitation in the arrangement of each component due to a limitation in the internal layout of the vehicle, increased difficulty in designing a hose route and the route connection, a plurality of air transportations required to mount and connect each component and hose to the vehicle, and increased resistance on the coolant side due to a complex route, resulting in generating a high load in the water pump.

In addition, a problem occurred that the cooling became difficult because of the increased temperature of the inverter module since the peripheral temperature of the electric compressor is high in a modularized structure of the electric compressor, the heat exchanger, the refrigerant, and the flow path of the refrigerant and the coolant.

When the temperature of the inverter module increases, various applications to circuitry components may be damaged or malfunction, which may lead to an error in the electric compressor. Accordingly, a measure for stable cooling of the inverter module is needed.

SUMMARY

The present embodiments provide a vehicular electric compressor and a heat exchanger module including the same, which may maintain operational safety through stable cooling of the inverter module, by separating the first and the second components on the basis of a wall part so as to improve the layout, and improving the arrangement structure through separation of a control unit from the electric compressor so that cooling through a surface contact with a low-temperature chiller can be performed.

One embodiment is a heat exchanger module, including: heat exchanger components; a manifold configured to provide a flow path for a fluid moving between the heat exchanger components; and a bracket allowing the manifold and the heat exchanger components to be mounted thereon and an electric compressor, and the electric compressor may include: a compression unit configured to compress a refrigerant; a motor unit configured to provide a driving force; and a control unit on which various circuitry components are mounted so as to control the motor unit, and the control unit may be installed separately from the compression unit and the motor unit.

Among the heat exchanger components, the compression unit, and the motor unit of the electric compressor may be disposed on one side of the bracket, and the control unit may be disposed on another side of the bracket.

The heat exchange components may include: first components disposed on a same side of the bracket and comprising the compression unit, the motor unit, a water condenser configured to heat exchange with a refrigerant discharged from the electric compressor, and an accumulator; and second components disposed on a same side of the bracket as the control unit.

The control unit may be an inverter module electrically connected to the electric compressor through a harness H.

The second component may include: a first chiller configured to allow a fluid for cooling a battery module provided in an environmentally friendly vehicle to flow therethrough; and a second chiller configured to allow a fluid for cooling a passenger compartment of the environmentally friendly vehicle to flow therethrough.

In the control unit, cooling may be performed through heat transfer with a fluid transferred to the first chiller or the second chiller.

The control unit may maintain a state of being in surface contact in a horizontal direction with an outer lateral surface of the first chiller.

The control unit may maintain a state of being in surface contact in a horizontal direction with outer lateral surfaces of the first chiller and the second chiller, respectively.

Between the control unit and an outer lateral surface of the first chiller, a heat transfer member may be interposed.

The control unit may maintain a state of being in surface contact in a longitudinal direction with outer lateral surfaces of the first chiller and the second chiller, respectively.

At least some of the heat exchange components may be mounted on the manifold to be directly communicated with the flow path of the manifold, and at least some of the remaining heat exchange components may be mounted on a bottom part of the bracket to be fluidly connected to the flow path of the manifold through a hose.

The bracket may include: a bottom part forming a bottom; and a wall part extending upward from the bottom part and forming a wall, and the heat exchange components may be dividedly disposed on a front side and a rear side based on the wall part, respectively, and the electrical compressor may be disposed in the bottom part, and the second component may be disposed in the wall part.

The manifold may include: a first manifold having a plate shape and in which a first flow path is formed; and a second manifold having a plate shape and in which a second flow path is formed, and the first manifold may be coupled to a front surface of the wall part, and the second manifold may be coupled to a rear surface of the wall part.

At least some of the components disposed on the front side based on the wall part may be mounted on the first manifold, and at least some, including the first and the second chillers, of the components disposed on the rear side based on the wall part may be mounted on the second manifold.

Among the heat exchange components, a water condenser, an accumulator, and an electric compressor may be disposed on a front side based on the wall part, and the first and the second chillers may be disposed on a rear side based on the wall part.

The water condenser and the accumulator may be directly mounted on the first manifold, the electric compressor may be directly mounted on the bottom part of the bracket, and the first and the second chillers may be directly mounted on the second manifold.

In the first manifold, at least one or more first ports in communication with the first flow path and slightly protruding rearward from a rear surface of the first manifold may be provided, and in the wall part and the second manifold, respectively, a pass-through structure passing through the wall part and the second manifold may be formed so that the first port is penetrable.

In the second manifold, at least one or more second ports in communication with the second flow path and slightly protruding rearward from a rear surface of the second manifold may be formed, and in the wall part and the first manifold, respectively, a pass-through structure passing through the wall part and the second manifold may be formed so that the second port is penetrable.

In the first manifold, at least one or more first inlets configured to introduce a refrigerant or a coolant from an outside thereinto and at least one or more first outlets configured to discharge a refrigerant or a coolant to an outside may be provided, in the second manifold, at least one or more second inlets configured to introduce a refrigerant or a coolant from an outside thereinto and at least one or more second outlets configured to discharge a refrigerant or a coolant to an outside may be provided, the first inlet and the first outlet may be positioned in an upper portion of the first manifold, respectively, and the second inlet and the second outlet may be positioned in an upper portion of the second manifold.

The heat exchanger module may further include; a case configured to cover an upper part, and in the case, a connector opening may be formed to allow a low voltage connector and a high voltage connector provided in the control unit to be exposed to an outside of the case.

In the case, a manifold opening may be formed so as to allow upper portions of the first manifold and the second manifold to protrude outward.

Another embodiment is an electric compressor, including: a bracket formed of a bottom part and a wall part; and a compressor disposed on one side based on the wall part and configured to compress a refrigerant at a high temperature and a high pressure, with the compressor comprising a compression unit configured to compress a refrigerant, a motor unit configured to provide a driving force, and a control unit on which various circuitry components are mounted so as to control the motor unit, and the control unit may allow cooling to be performed by at least one heat exchange component of a heat exchanger module installed separately from the compression unit and the motor unit.

The control unit may come into close contact with an outer lateral surface of the heat exchange component so that heat exchange is performed therebetween, and the heat exchange component may include: a manifold configured to provide a flow path for a fluid moving between the heat exchanger components; and a bracket provided to allow the manifold and the heat exchanger components to be mounted thereon.

The heat exchange component may be a heat exchanger in which a refrigerant flows.

The heat exchange component may be a heat exchanger in which a coolant flows.

The present embodiments may facilitate stable cooling by separating the first component configured to be operated with a working fluid of a high heat source, and the second component configured to be operated with a working fluid of a relatively low heat source from each other in the arrangement, and separating the control unit from the first component and combining the control unit to come into close contact with the second component.

The present embodiments may facilitate stable operation and control of the electric compressor, at the same time, because circuitry components forming the control unit and the switching components can be operated without being exposed to a high temperature environment, thereby improving the safety, and preventing malfunction due to the damages.

The present embodiments may improve the layout by separating the first and the second components on the basis of the wall part in the arrangement, and integrating the components with the case, thereby the operator may install the compressor more conveniently.

DESCRIPTION OF DRAWINGS

FIG. 15 is a cooling circuit diagram according to an embodiment of the present disclosure.

DESCRIPTION OF AN EMBODIMENT

Figure 1:
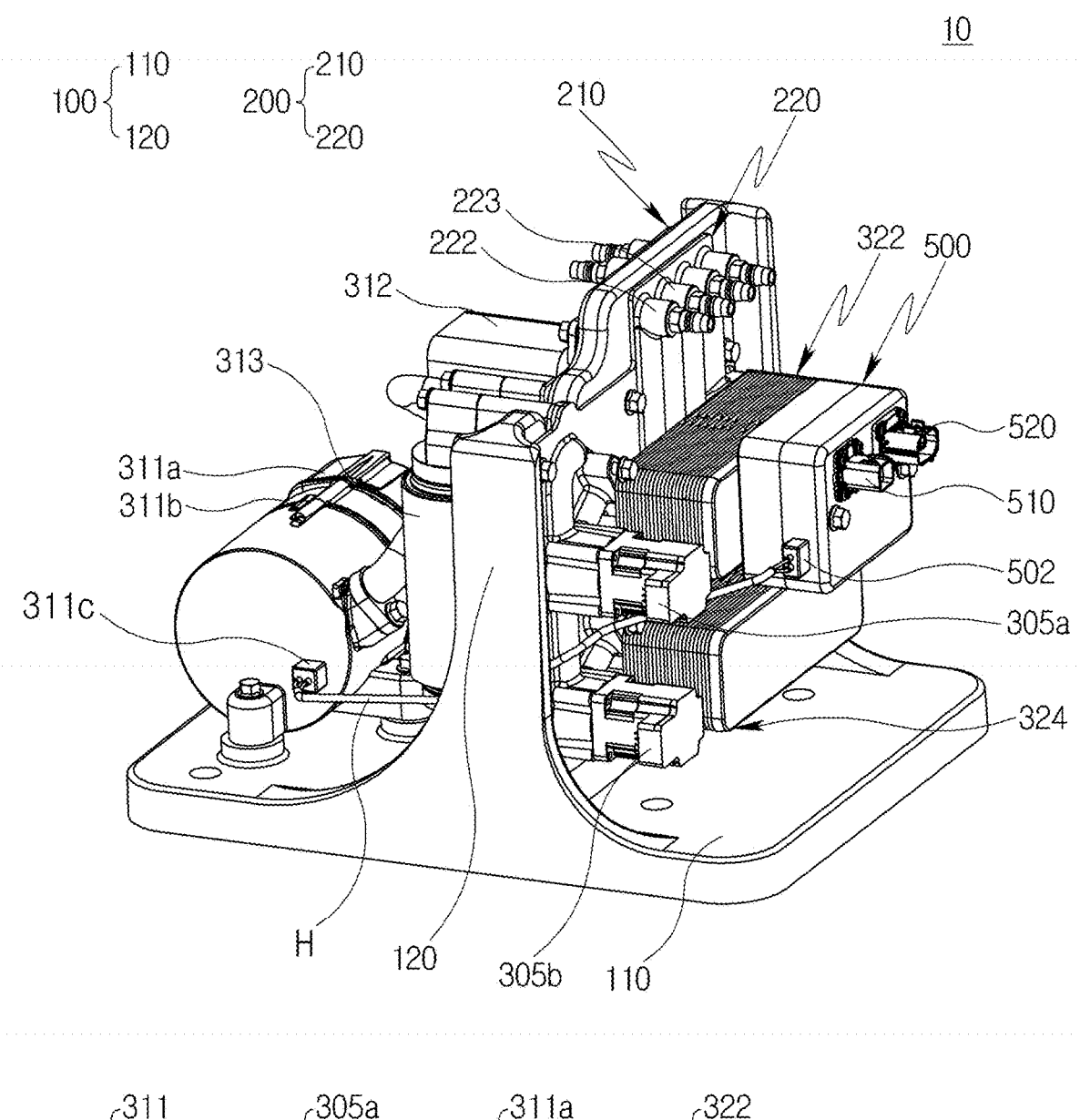
FIG. 1 is a perspective view illustrating a heat exchanger module according to an embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims. Like reference numerals generally denote like elements throughout the specification.

What one component is referred to as being "connected to" or "coupled to" another component includes both a case where one component is directly connected or coupled to another component and a case where a further another component is interposed between them. Meanwhile, what one component is referred to as being "directly connected to" or "directly coupled to" another component indicates that a further another component is not interposed between them. The term "and/or" includes each of the mentioned items and one or more all of combinations thereof.

Terms used in the present specification are provided for description of only specific embodiments of the present invention, and not intended to be limiting. In the present specification, an expression of a singular form includes the expression of plural form thereof if not specifically stated. The terms "comprises" and/or "comprising" used in the specification is intended to specify characteristics, numbers, steps, operations, components, parts, or any combination thereof which are mentioned in the specification, and intended not to exclude the existence or addition of at least one another characteristics, numbers, steps, operations, components, parts, or any combination thereof.

While terms such as the first and the second, etc., can be used to describe various components, the components are not limited by the terms mentioned above. The terms are used only for distinguishing between one component and other components.

Figure 2:
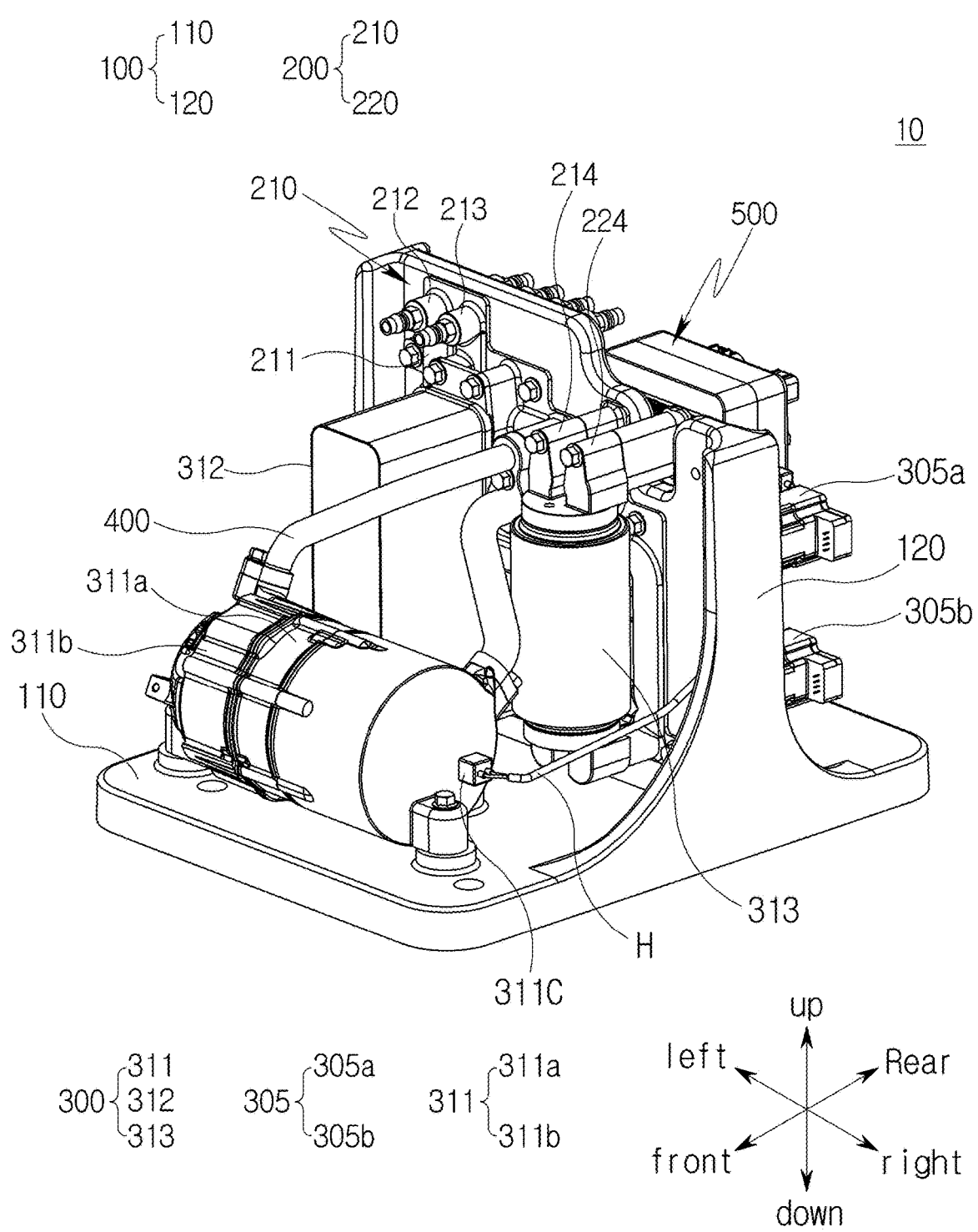
FIG. 2 is a perspective view illustrating FIG. 1 at a different angle.
Figure 3:
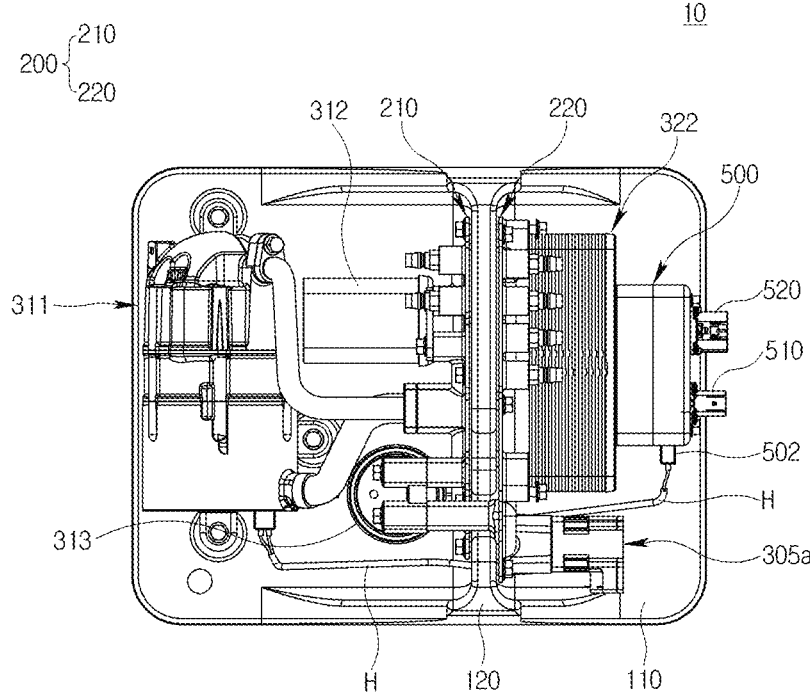
FIG. 3 is a plan view of FIG. 1.
Figure 4:
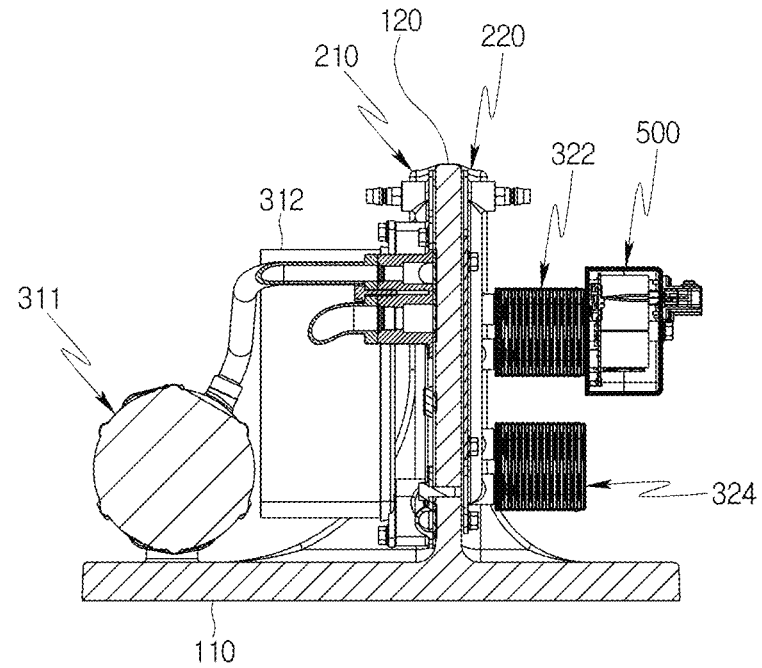
FIG. 4 is a longitudinal cross-sectional view of FIG. 3.
Figure 5:
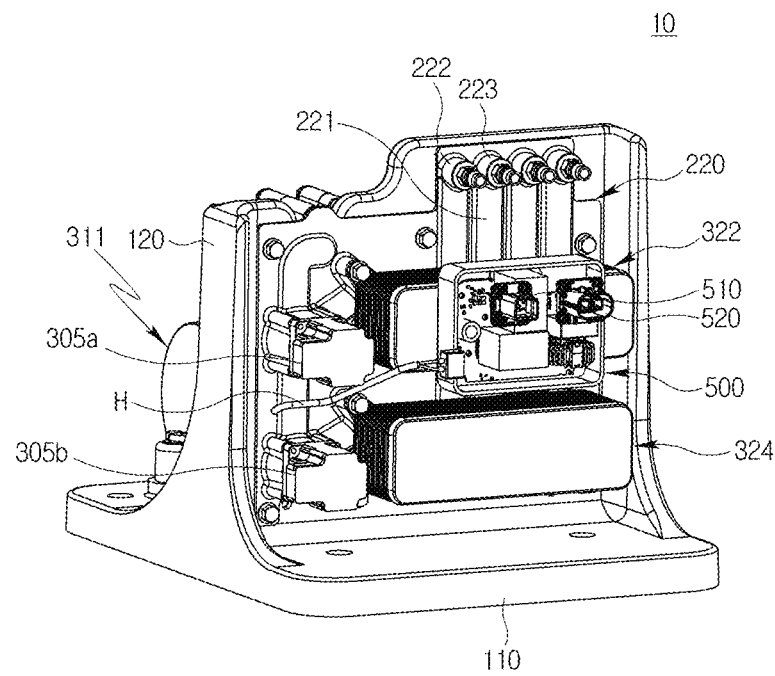
FIG. 5 is a perspective view illustrating a state in which a control unit is mounted on a heat exchanger module according to an embodiment.
Figure 6:
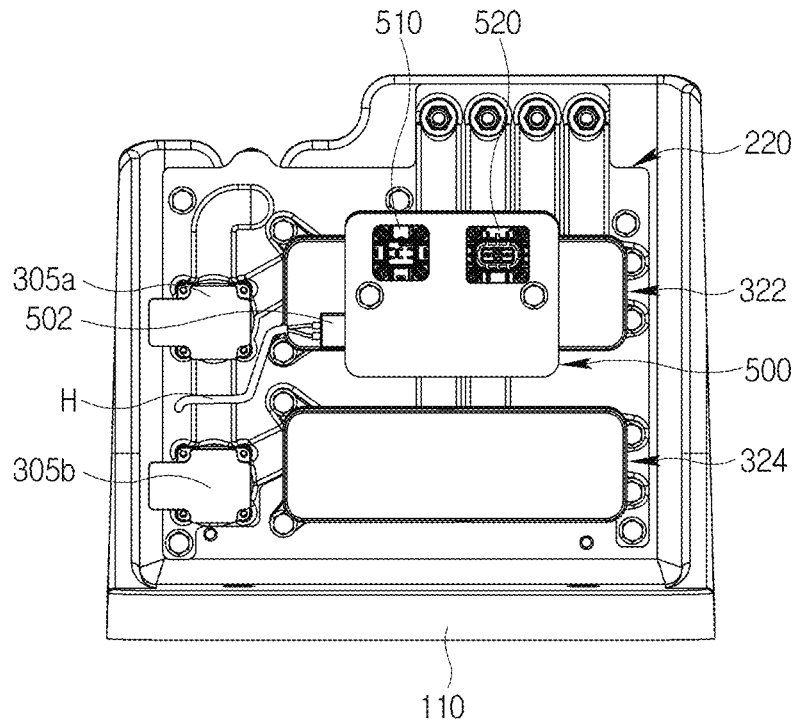
FIG. 6 is a view illustrating FIG. 5 at a different angle.

For reference, FIG. 1 is a perspective view illustrating a heat exchanger module according to an embodiment of the present disclosure, FIG. 2 is a perspective view illustrating FIG. 1 at a different angle, FIG. 3 is a plan view of FIG. 1, FIG. 4 is a longitudinal cross-sectional view of FIG. 3, FIG. 5 is a perspective view illustrating a state in which a control unit is mounted on a heat exchanger module according to an embodiment, and FIG. 6 is a view illustrating FIG. 5 at a different angle.

With reference to FIGS. 1 to 6, a heat exchanger module 10 according to this embodiment is described based on its installation in the environmentally friendly vehicle, however, is not limited thereto, and the vehicle to install the heat exchanger module therein may be changed variously.

The heat exchanger module 10 may include a bracket 100, a manifold 200, and a heat exchanger component 300.

More particularly, the heat exchanger module 10 may include heat exchange components 300, a manifold configured to provide a flow path for the fluid moving between the heat exchange components 300, a bracket 100 provided to mount the manifold 200 and the heat exchange components 300 thereon, and an electric compressor 311.

Further, the electric compressor 311 may include a compression unit configured to compress a refrigerant, a motor unit configured to provide a driving force, and a control unit 500 on which various circuitry components are mounted to control the motor unit, and the control unit 500 may be separated from the compression unit and the motor unit.

That is, the control unit 500 may be separated from and not coupled to any one heat exchange component in which a high operational temperature is maintained so that the control unit 500 is not operated in a condition in which the temperature is not increased by the heat exchange component having a high operational temperature, and may be installed in another heat exchange component in which a low operational temperature is maintained so that cooling is obtained to allow semiconductor parts such as the circuitry component or the switching components to operate at a relatively low temperature, thereby preventing errors due to malfunction or damage.

The bracket 100 may include a bottom part 110 forming a bottom to allow the manifold 200 which will be described below and the heat exchange components 300 to be mounted thereon, and a wall part 120 extending upward from the bottom part 110 and forming the wall.

The bottom part 110 and the wall part 120 is not necessarily limited to shapes illustrated in drawings, and the shapes thereof may be variously changed.

The heat exchange components 300 may mean various constituent components applied in the vehicle cooling system, and for example, the compression unit and the motor unit of the electric compressor 311 may be disposed on one side of the bracket 100, and the control unit 500 may be disposed on the other side of the bracket 100, each independently.

The heat exchange components 300 may include a first component 310 including the compression unit, the motor unit, and a water condenser 312 in which heat exchange with the refrigerant discharged from the electric compressor 311 is performed, and an accumulator 313 and disposed on the same side of the bracket 100, and a second component 320 along with the control unit 500 disposed on the same side of the bracket 100.

The heat exchange components 300 may be disposed on a front side and a rear side based on the wall part 120, respectively. For example, among the heat exchange components 300, the electric compressor 311 forming the first component 310, the water condenser 312, and the accumulator 313 may be disposed on the front side of the wall part 120, on the bottom part 110.

The second component 320 may include a first chiller 322 configured to allow a fluid to cool a battery module provided in an environmentally friendly vehicle, and a second chiller 324 configured to allow a fluid to cool a passenger compartment of the environmentally friendly vehicle.

In addition, an expansion valve 326 which corresponds to the second component 320 may be disposed on a rear side of the wall part 120.

The present disclosure is comprised of the bottom part 110 which is a horizontally extended bracket 100, and the wall part 120 which vertically extends upward from the bottom part 110. The bottom part 110 provides a reference surface installed in the vehicle body, and the heat exchange components 300 and the manifold 200 may be fixed or mounted using the wall part 120, the assembly thereof can be made easier and the overall compactization of the heat exchanger module 10 can be made possible.

In addition, packaging between components may be increased because this embodiment uses both a front surface and a rear surface of the wall part 120, and for this purpose, as illustrated, the wall part 120 may be optionally installed at any one among a center position, or a position eccentric to one side from the center, rather than a corner of the bottom part 110.

The water condenser 312 among the first component 310 is a heat exchanger configured to condense a refrigerant in a gaseous state using a coolant, and the accumulator 313 is a liquid separator configured to separate a liquid refrigerant and a gaseous refrigerant from each other.

The electric compressor 311 is configured to compress a refrigerant at a high temperature and a high pressure, and discharge the refrigerant to the water condenser 312, and an expansion valve 305 is configured to change a pressure of a refrigerant in a gaseous state so as to gasify the refrigerant.

The heat exchange components 300 form the heat exchanger module 10 by being mounted on the bracket 100, or on the manifold 300. The heat exchange components 300 may be mounted thereon to be fluidically connected to a refrigerant formed inside the manifold 100, or to a flow path through which a coolant flows.

More specifically, each heat exchange component 300 may be in communication with the flow path, because the each heat exchange component 300 is mounted in communication with a port which corresponds to the each heat exchange component 300 among ports formed in the manifold 200 and in communication with the flow path.

The manifold 200 consists of a first manifold 210 and a second manifold 220, and accordingly, consists of a first port

214 provided in the first manifold 210, and a second port 224 provided in the second manifold 220.

The heat exchange components 300 may be coupled to at least one among the first port 214 and the second port 224 so as to be in communication with the flow path.

The manifold 200 may be formed in a shape of a flat plate. The manifold 200 may include a first manifold in which a first flow path 211 is formed and having a shape of a plate, and a second manifold 220 in which a second flow path 221 is formed.

The first flow path 211 and the second flow path 221 are a part of the flow path configured to flow the refrigerant or the coolant of the manifold. In at least one among the first flow path 211 and the second flow path 221, at least some region thereof may have a manifold structure in which a plurality of unit flow paths are overlapped.

The first manifold 210 and the second manifold 220 may be formed in a structure in which the first manifold 210 and the second manifold 220 are stacked to each other, with the wall part 120 interposed therebetween.

For example, the first manifold 210 may be coupled to a front surface of the wall part 120 of the bracket 100, and the second manifold 220 may be coupled to a rear surface of the wall part 120 of the bracket 100.

Among the first components 310 mounted at a front side on the basis of the wall part 120, the water condenser 312 and the accumulator 313 are directly mounted on a front surface of the first manifold 210, and at least some among the second components 320 mounted at a rear side, for example, the first chiller 322 and the second chiller 324 and the expansion valve 305 may be directly mounted on a front surface of the second manifold 220.

As such, by divisionally arranging two plate-shaped manifolds, that are, the first manifold 210 and the second manifold 220, on the front surface and the rear surface of the wall part, complex loops may be deleted, and by forming the manifold 200 in a shape of a wide plate, a plurality of components may be directly mounted on the manifold 200, thereby the heat exchanger module 100 can be more compressively packaged.

In addition, it is advantageous in the aspects of the noise, vibration, and the durability because the two plate-shaped manifolds are mounted on the bracket, respectively, and weights of the manifolds and the refrigerant or the coolant flowing therethrough may be directly supported by the bracket.

In the first manifold 210, at least one or more first inlets 212 configured to introduce the refrigerant or the coolant from the outside, and at least one or more first outlets 213 configured to discharge the refrigerant or the coolant to the outside may be provided.

In addition, in the second manifold 220, at least one or more second inlets 222 configured to introduce the refrigerant or the coolant from the outside, and at least one or more second outlets 223 configured to discharge the refrigerant or the coolant to the outside may be provided. The first inlet 212 and the first outlet 213 may be provided one in number, respectively, and the second inlet 222 and the second outlet 223 may be provided two in number, respectively.

The first inlet 212 and the first outlet 213 may be positioned at an upper portion of the first manifold 210, respectively, and the second inlets 222 and the second outlets 223 may be positioned at an upper portion of the second manifold 220, respectively.

As such, the first manifold 210 and the second manifold 220 may be mounted on the front surface and the rear surface of the wall part 120, respectively, and accordingly, all the inlet and the outlet of the first manifold 210, and the inlet and the outlet of the second manifold 220 may be positioned at an upper portion side of the heat exchanger module 10. This may provide convenience of the assembly when configuring the heat exchanger module.

In the heat exchanger module 10 according to the present embodiment, at least some among the heat exchange components 300 may be mounted on the manifold 200, and at least some among the remaining heat exchange components 300 may be mounted on the bracket 100.

In this case, the heat exchange component 300 mounted on the manifold may be directly communicated with the flow path of the manifold 200 through the port of the manifold 200, however, unlike this, the heat exchange component 300 mounted on the bracket 100 may be fluidically connected to the flow path of the manifold 200 through a hose 400.

As described above, the present disclosure may improve packageability and realize modularity because the bracket 100 is formed of the bottom part 110 and the wall part 120, and both the bottom part 110 and the wall part 120 are used as spaces for mounting components, and may provide a convenience in the mounting of the entire module because such an integrated module can be simply mounted on the vehicle body.

The present embodiment is characterized in an arrangement structure of the first and the second components 310 and 320 and the control unit 500 in the heat exchange module 10, and may be applied in a heat exchange system of an electric compressor on which the heat exchanger module 10 is mounted.

The control unit 500 is not coupled to the electric compressor 311, and a state in which the control unit 500 is in a surface contact with an outside of the second component 320 is maintained as illustrated in the drawings, therefore, stable cooling is performed in a state in which a problem of overheating is minimized because the heat exchange with a heat source at a high temperature due to the compression unit (not illustrated) is not performed and the heat exchange with the second component 320 at a relatively low temperature is performed.

Through this configuration, the present embodiment enables a stable operation all the time because the control unit 500 is influenced by a peripheral temperature outside the heat exchanger module 100 and a sudden surge of the operating temperature at minimum, and prevents malfunction due to a high temperature and damage of the circuitry components and the switching components provided in the control unit 500.

The control unit 500 is electrically connected through a harness H having one end coupled to a first terminal 311c, and configured to apply power to the motor unit and control operations through a power provided from the outside and a control signal.

More particularly, a stator (not illustrated) forms electromagnetic fields by the power applied from the control unit 500, and as a rotor (not illustrated) rotates by the electromagnetic fields formed by the stator, a rotational force to drive the compression unit is generated.

The control unit 50 according to the present embodiment is limited to an inverter module electrically connected to the electric compressor 311 through the harness H. In the inverter module, various circuitry components and the switching components are mounted on the printed circuit board (not illustrated) so as to control operations of the electric compressor 311, and a low voltage connector 510 for communication and a high voltage connector 520 for power supply are provided.

The lower voltage connector 510 and the high voltage connector 522 are electrically connected to an external power supply connector (not illustrated), and to the printed circuit board (not illustrated), thereby supplying external power to the components mounted on the printed circuit board (not illustrated).

In addition, in the control unit 500, a second terminal 502 for allowing the control unit 500 to be electrically connected to the harness H is provided, thereby a stable control over the compression unit may be performed.

In the control unit 500 according to the present embodiment, cooling is performed through heat transfer with a fluid transferred to the first chiller 322 or the second chiller 324 forming the second component 320.

For example, the first chiller 322 is positioned at an upper portion of the rear surface of the second manifold 220, and the second chiller 324 is positioned at a position spaced apart downward from the first chiller 322.

The first chiller 322 maintains a low temperature because the refrigerant at a low temperature and a low pressure is introduced into the first chiller 322 through a first expansion valve 305a forming the expansion valve 305, and the coolant cooled in the battery module is introduced into the first chiller 322 together with the refrigerant and then the heat exchange is performed.

In addition, the second chiller 324 maintains the low temperature together with the first chiller 322 because the refrigerant at a low temperature and a low pressure is introduced into the second chiller 324 through a second expansion valve 305b, and the coolant cooled in an internal evaporator is introduced into the first chiller 322 together with the refrigerant and then the heat exchange is performed.

The control unit 500 may be disposed on an outer lateral surface of the second component 320 horizontally, for example, and a position of installation may maintain a state in which a surface contact is formed with one among an outer lateral surface of the first chiller 322 or an outer lateral surface of the second chiller 324.

However, in the present embodiment, because a surface temperature of the first chiller 322 is maintained to be relatively lower than a surface of the second chiller 324, it is illustrated in the drawing that the surface contact state is maintained in the horizontal direction of the outer lateral surface of the first chiller, however, it may be possible to configure the surface contact to be formed with the outer lateral surface of the second chiller 324 in the horizontal direction.

Figure 7:
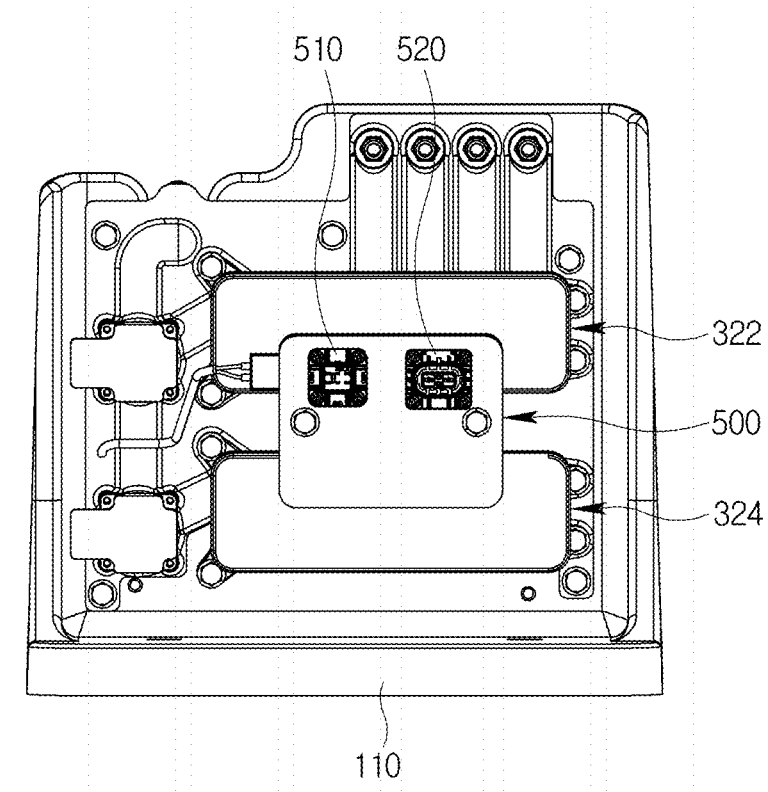
FIG. 7 is a view illustrating a control unit installed in a second component according to an embodiment of the present disclosure.

With reference to FIG. 7, the control unit 500 according to the present embodiment may maintain the state of the surface contact in the horizontal direction with the outer lateral surfaces of the first chiller 322 and the second chiller 324, respectively.

Both the first and the second chillers 322 and 324 maintain the low temperature on the outer lateral surfaces, and thus, combining the control unit 500 with the first chiller 322 and the second chiller 324, respectively, in the state of being in surface contact with the first and the second chillers 322 and 324 may be possible for facilitating a stable cooling performance.

In particular, if the control unit 500 comes into surface contact with the first and the second chillers 323 and 324 in the horizontal direction respectively, and one among the first and the second chillers 323 and 324 malfunctions and the other chiller operates normally, cooling of the control unit

500 may be achieved. Therefore, it is a stable arrangement state which may prepare for failure.

Figure 8:
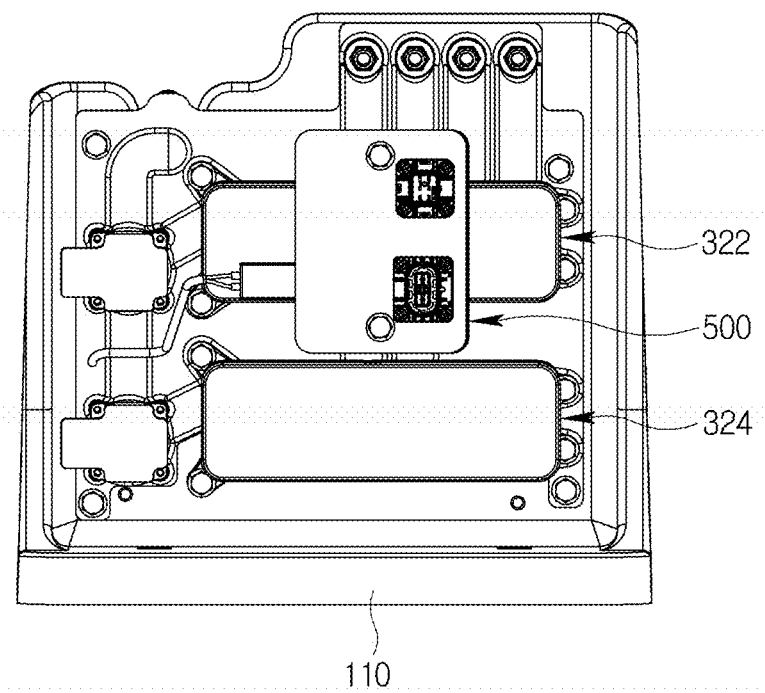
FIGS. 8 to 10 are views illustrating various installation states of a control unit according to an embodiment.

Referring to FIG. 8, the control unit 500 according to the present embodiment may maintain the state of being in surface contact in the longitudinal direction with the first chiller 322 only. The optimal arrangement of the control unit 500 in the horizontal or longitudinal directions may be selectively performed through temperature drop distribution according to the temperature transfer.

Figure 9:
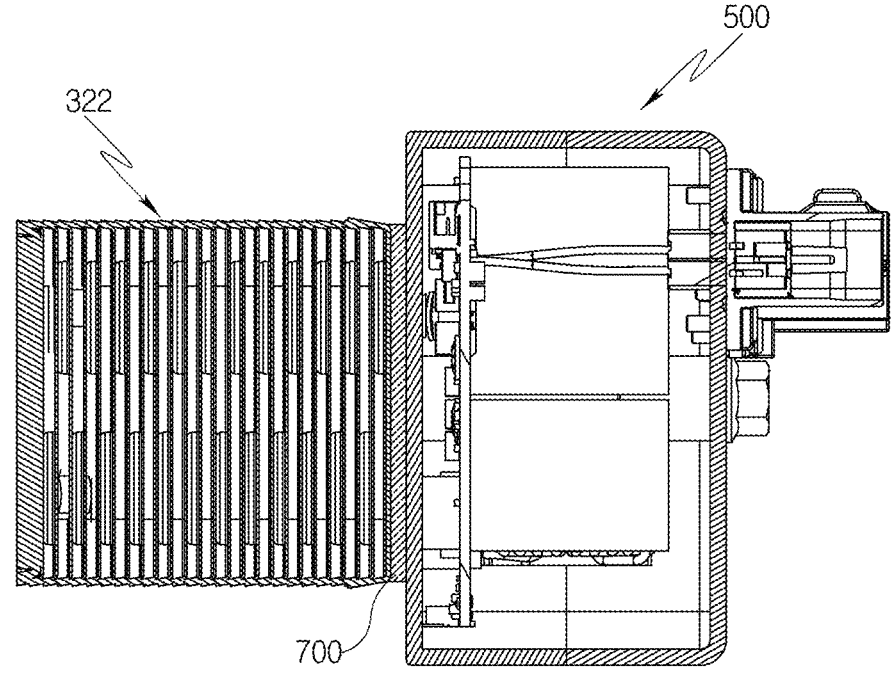

Referring to FIG. 9, the present embodiment may provide a heat transfer member 700 between the control unit 500 and an outer lateral surface of the first chiller 322.

The heat transfer member 700 may receive a heat source at a low temperature generated in the first chiller 322 and exchange heat with the control unit 500 so as to cool the control unit 500 fast and efficiently, thereby improving efficiency of cooling and heat dissipation at the same time.

Figure 10:
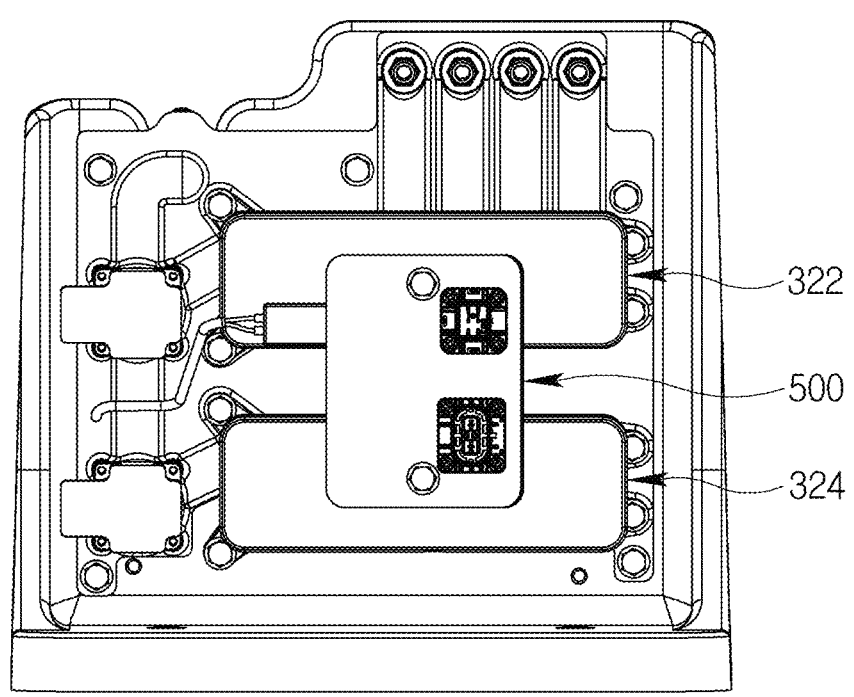

Referring to FIG. 10, the control unit 500 according to the present embodiment may maintain the state of being in surface contact with the outer lateral surfaces of the first chiller 322 and the second chiller 324 in the longitudinal direction, respectively.

In a state in which the control unit 500 comes into surface contact with the first and the second chillers 322 and 324 in the longitudinal direction, respectively, if one among the first chiller 322 or the second chiller 324 malfunctions, and the other chiller operates normally, the cooling of the control unit 500 may be performed. Therefore, it is a stable arrangement state which may prepare for failure.

Therefore, the control unit 500 may be cooled all the time in a stable manner through the heat exchange.

Figure 11:
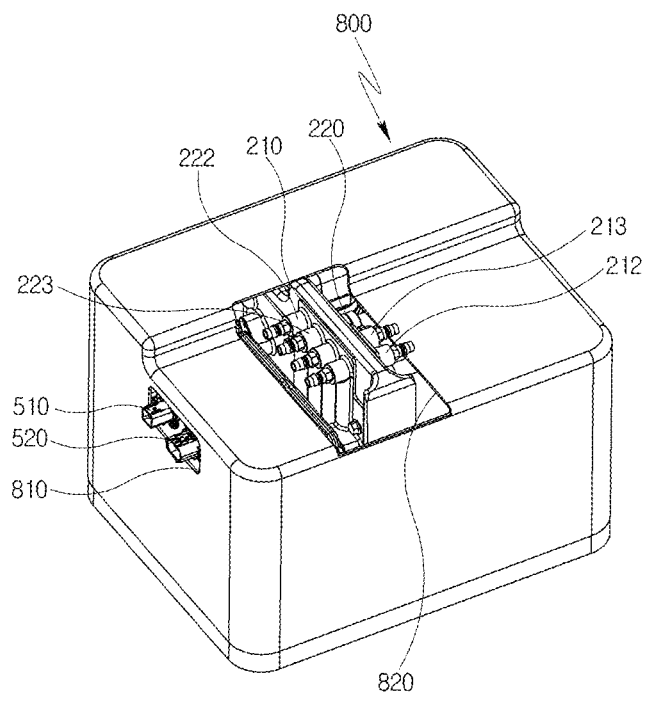
FIG. 11 is a perspective view illustrating a case and a heat exchanger module accommodated in the case according to an embodiment.

Referring to FIG. 11, the heat exchanger module 10 according to the present embodiment may further include a case 800 which covers an upper part. The case 800 may be configured to cover the heat exchanger module 10 from the outside, formed in a size corresponding to the bracket 100 and formed to be coupled to the bracket 100.

In addition, in the bracket 100, a coupling structure such as a clamp or a hook for coupling to the case 800 may be provided.

In the case 800, a connector opening 810 configured to allow the low voltage connector 510 and the high voltage connector 520 provided in the control unit 500 to be exposed to the outside of the case 800 is formed.

The connector opening 810 provides improved convenience when the operator conducts an electrical connection work.

In the case 800, a manifold opening 820 configured to allow upper portions of the first manifold 210 and the second manifold 220 to protrude outward is formed.

When the manifold opening 820 is formed, the upper portions of the first and the second manifolds 210 and 220 may be exposed upward of the case 800, and accordingly, the operator may conduct the works for the hose connected to the first inlet 212, the first outlet 213, the second inlet 222, and the second outlet 223 more conveniently.

The electrical compressor according to an embodiment of the present disclosure is mainly characterized in the arrangement structure of the control unit 500 and the first and the second components 310 and 320 in the heat exchanger module 10, and the arrangement structure may be applied in the heat exchanger module 10 on which the electrical compressor 311 is mounted.

To this end, the present embodiment may include the bracket 100 formed of the bottom part 110 and the wall part 120, and the electric compressor positioned at one side on the basis of the wall part 120, configured to compress the refrigerant at a high temperature and a high pressure and including the compression unit configured to compress the refrigerant, the motor unit configured to provide a driving force, and the control unit 500 on which various circuitry components are mounted so as to control the motor unit, and the control unit 500 is cooled by at least one heat exchange component 300 of the heat exchanger module 10, which is installed separately from the compression unit and the motor unit.

The heat exchanger module 10 is separated from the entrance and exit of the coolant according to the operation of the electric compressor 311 and comes into close contact with the second component 320.

The electric compressor includes the motor unit (not illustrated), the compression unit (not illustrated), which have been described above, and a housing.

The housing forms the overall external appearance of the electric compressor, and consists of a front housing 311a and a rear housing 311b in this embodiment.

The motor unit is provided in the front housing 311a, and is configured to provide power for the compression unit to compress the refrigerant. The motor unit includes a rotor (not illustrated) configured to be coupled to a rotational axis (not illustrated) rotatably installed at a center of the front housing 311a, a stator (not illustrated) fixed in the front housing 311a and disposed radially outward of the rotor. The stator includes a stator core (not illustrated) and a coil (not illustrated) configured to be wound on the stator core.

The compression unit is provided inside the rear housing 311b, and includes an orbiting scroll (not illustrated) coupled to the rotational axis through an eccentric bush, and a fixed scroll fixed between the front housing 311a and the rear housing 311b and forming, together with the orbiting scroll, a compression chamber in which compression of the refrigerant is performed. The first terminal 311c is provided on the outside of the electric compressor 311.

As such, as the compression unit is connected to the motor unit through the rotational axis, the rotational force generated in the motor unit may be transferred to the orbiting scroll of the compression unit through the rotational axis.

The control unit 500 is not coupled to the electric compressor 311 and maintains the state of being in surface contact with the outside of the second component 320 as illustrated in the drawing, therefore, the heat exchange with the heat source at a high temperature by the compression unit is not performed, and stable cooling is performed through the heat exchange with the second component 320 at a relatively low temperature.

With this configuration, the present embodiment is influenced by the peripheral temperature outside the heat exchanger module 10 and a sudden surge of the operating temperature of the control unit 500 at minimum, therefore, ensures stable operation all the time, and prevents malfunction caused by heat at a high temperature and damage of the circuitry components or switching components provided in the control unit 500.

The control unit 500 is electrically connected through the harness H having one end coupled to the first terminal 311c, thereby applying power to the motor unit and controlling operations through control signals and power provided from the outside.

More particularly, the stator forms electromagnetic fields by the power supplied from the control unit 500, and the rotational force for driving the compression unit is generated as the rotor rotates by the electromagnetic field formed by the stator.

The control unit 500 according to the present embodiment is limited as the inverter module which is electrically connected to the electric compressor 311 through the harness H. The inverter module has various circuitry components and switching components for controlling the operation of the electric compressor 311 mounted on the printed circuit board (not illustrated), and has the low voltage connector 510 for communication, and the high voltage connector 520 for power supply.

In addition, the second terminal 502 through which the harness His electrically connected is provided, and therefore stable control over the compression unit may be performed.

The control unit 500 according to the present embodiment allows cooling through heat transfer with the fluid being transferred to the first chiller 322 or the second chiller 324.

For example, the first chiller 322 is disposed at an upper portion of the rear surface of the second manifold 220, and the second chiller 324 is disposed at a position being spaced apart downward from the first chiller 322.

The refrigerant at a low temperature and a low pressure is introduced into the first chiller 322 through the first expansion valve 305*a* forming the expansion valve 305, and the coolant which has been cooled in the battery module is introduced thereinto at the same time, thereby the heat exchange is conducted and the low temperature is maintained.

In addition, the refrigerant at a low temperature and a low pressure is introduced into the second chiller 324 through the second expansion valve 305*b*, the coolant which has been cooled in the internal evaporator is introduced into the second chiller 324 at the same time, the heat exchange is performed, and the low temperature is maintained together with the first chiller 322.

The operational state according to the flow of the refrigerant and the coolant in the electric compressor according to the present embodiment will be described with reference to the drawings.

Figure 12:
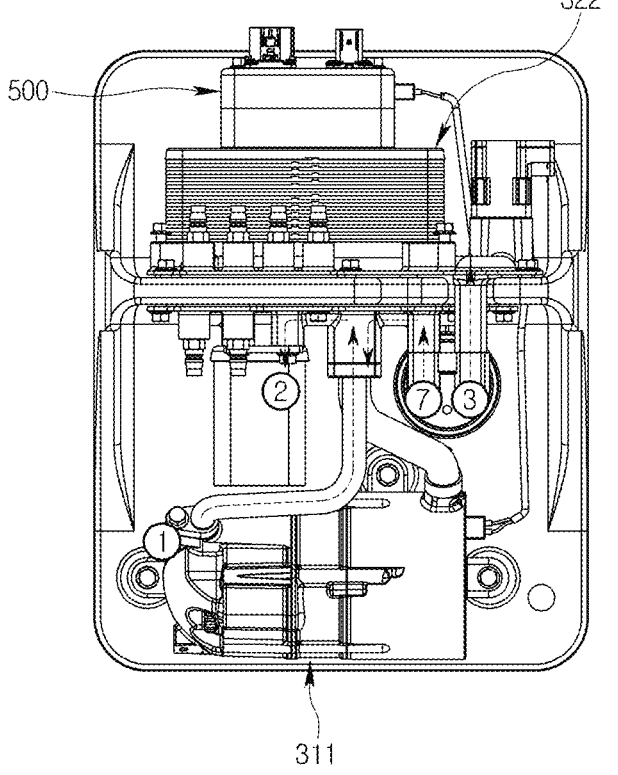
FIGS. 12 to 14 are operation state views of a heat exchanger module having an electric compressor according to an embodiment.
Figure 13:
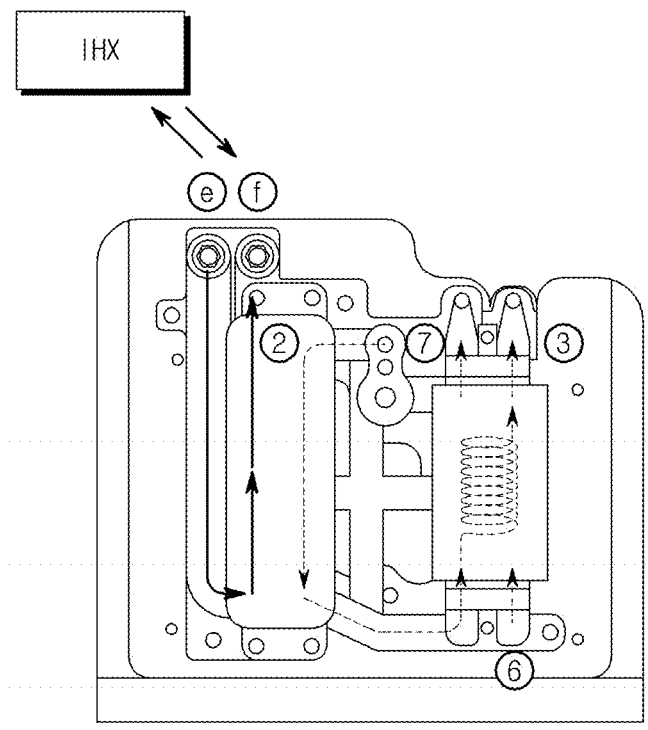
Figure 14:
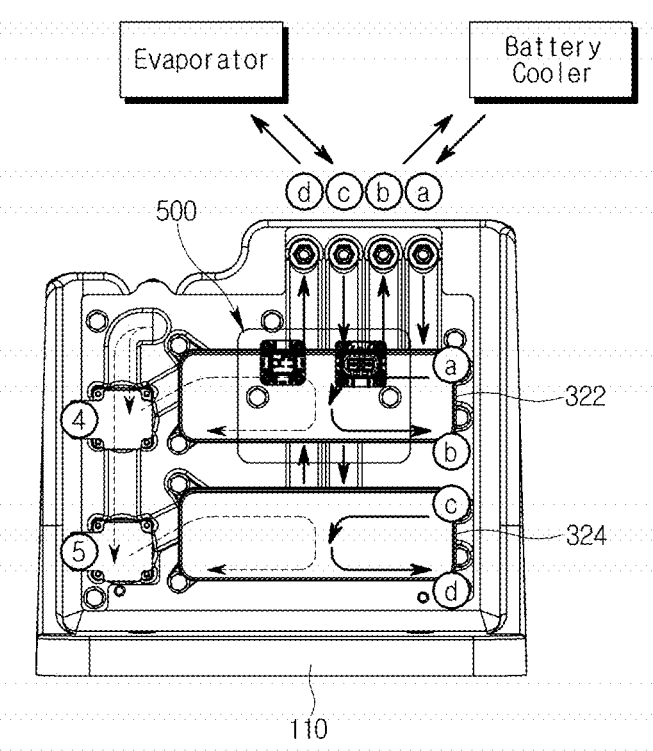

With reference to FIGS. 12 to 14, ① the refrigerant compressed by the electric compressor 311 is introduced into the water condenser 312, and ② as the refrigerant at a high pressure which has been cooled in the water condenser 312 goes upward through an internal conduit of the accumulator 313, the heat exchange between the refrigerant at a high pressure going upward and the refrigerant at a low temperature which has been filled inside is performed.

In addition, ③ the refrigerant at a high pressure which has gone upward after exchanging heat in the accumulator 313 is introduced into the second manifold 220 on the rear surface of the manifold 200, and ④ the refrigerant at a high pressure which has been introduced into the second manifold 220 on the rear surface of the manifold 200 is branched off to the first expansion valve 305*a* and the second expansion valve 305*b*, respectively, through a branch flow pipe formed in the second flow path, to be moved.

The first expansion valve 305*a* and the second expansion valve 305*b* may be opened to be controlled as needed for cases such as internal cooling, battery cooling, or simultaneous cooling etc. ⑤ In addition, the refrigerant has heat exchange in the first chiller 322 and the second chiller 324, and exchanges heat with the control unit 500 being in close contact with the outer lateral surface of the first chiller 322, facilitating the cooling of the control unit 500.

In this case, stable cooling is performed in the control unit 500 even though heat generation in the various circuitry components or switching components occurs, thereby preventing malfunction and damage to the circuitry components due to overheat.

The refrigerant is moved to the first and the second chillers 322 and 324 as described above, and is introduced into the first manifold 210, and ⑥ the flow path which has been divided at the first and the second chillers 322 and 324 may be merged as one again to be introduced into and to fill the accumulator 313. ⑦ In addition, the refrigerant which has passed through the accumulator 313 may be introduced into the electric compressor 311 again to be compressed therein.

The first inlet 222 ⓐ and the first outlet 223 ⓑ of the second manifold 220 are connected to a battery cooler and introduces the coolant heated in the battery cooler or discharges the coolant cooled to the battery cooler, and the second inlet ⓒ and the second outlet ⓓ of the second manifold 220 is connected to the evaporator and introduces the coolant heated in the evaporator or discharges the coolant cooled to the evaporator.

The first inlet ⓔ and the first outlet ⓕ of the first manifold are connected to an internal condenser IHX and may introduce the coolant cooled in the internal condenser or discharge the coolant heated to the internal condenser.

Figure 15:
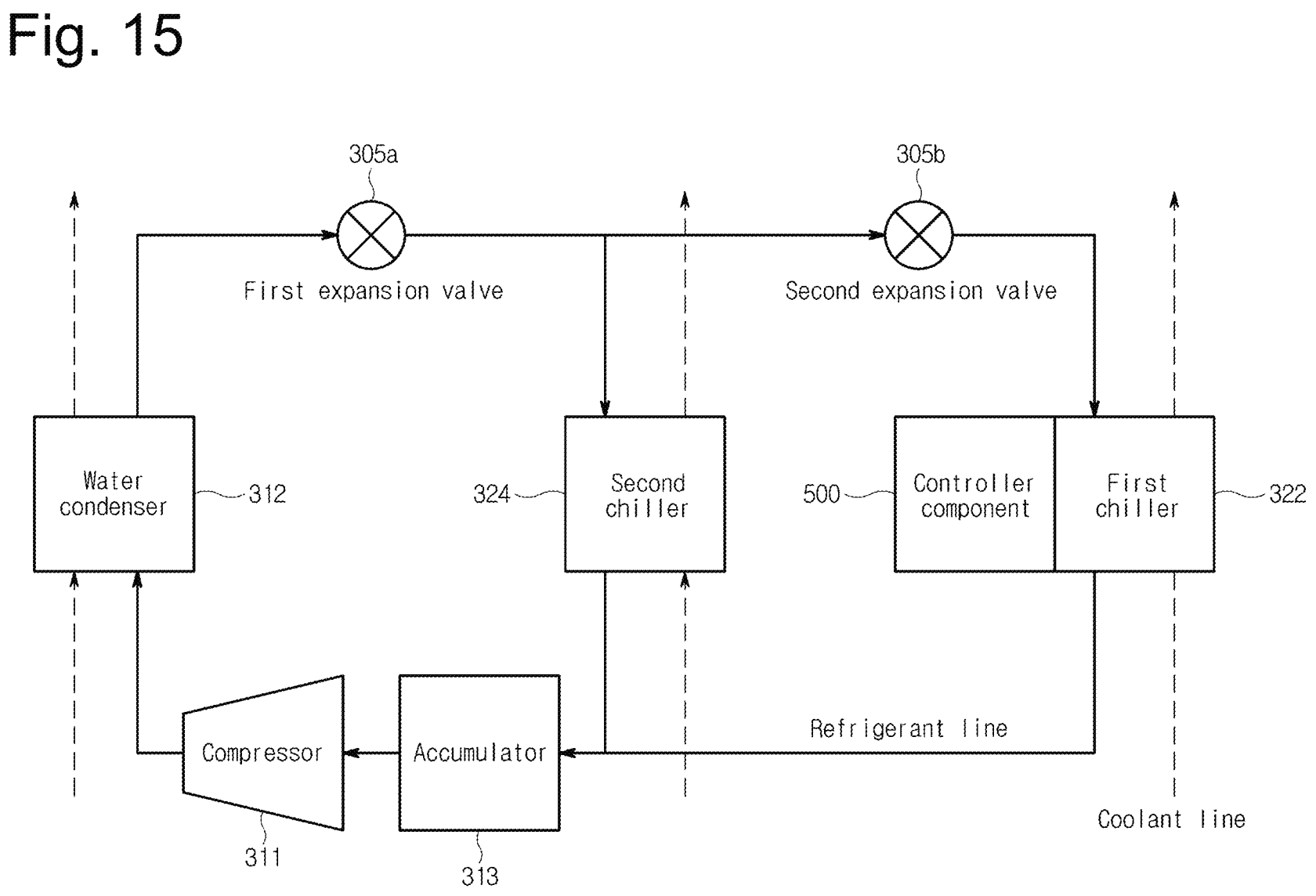

Referring to FIG. 15, which is a cooling circuit diagram according to the present embodiment, the control unit 200, as described according to the embodiment above, is cooled through the surface contact with the first chiller 322, and the cooling may be conducted constantly all the time because the coolant line is supplied to the first chiller 322.

The electric compressor 311 compresses the refrigerant which moves along the refrigerant line and supplies the compressed refrigerant to the water condenser 312, and the refrigerant is phase-shifted through the first expansion valve 305*a*, and exchanges heat in the second chiller 324. In addition, the refrigerant passes through the accumulator 313, and is introduced into the electric compressor 311 again to be circulated.

Although preferred embodiments of the present invention have been disclosed for illustrative purposes, those skilled in the art will appreciate that diverse variations and modifications are possible through addition, alteration, deletion, etc. of elements, without departing from the spirit and scope of the invention, and all variations or modifications deducible from the meanings, scope and equivalents of the claims are intended to be included in the scope of the present invention.

The present embodiments may be used for the vehicular electric compressor and the heat exchanger module including the same, which can maintain the operational safety through stable cooling of the inverter module.

The invention claimed is:

1. A heat exchanger module comprising:
heat exchanger components;
a manifold configured to provide a flow path for a fluid moving between the heat exchanger components;
a bracket allowing the manifold and the heat exchanger components to be mounted thereon; and
an electric compressor, wherein the electric compressor further comprises:
   a compression unit configured to compress a refrigerant;
   a motor unit configured to provide a driving force;
   a control unit on which circuitry components are mounted so as to control the motor unit, and wherein the control unit is installed separatedly from the compression unit and the motor unit, wherein among the heat exchanger components, the compression unit, and the motor unit of the electric compressor are disposed on one side of the bracket, and the control unit is disposed on another side of the bracket, wherein the heat exchanger components further comprise:

first components disposed on a same side of the bracket and comprising the compression unit, the motor unit, a water condenser configured to heat exchange with the refrigerant discharged from the electric compressor, and an accumulator;

second components disposed on a same side of the bracket as the control unit, wherein the second components further comprise:

a first chiller configured to allow a fluid for cooling a battery module provided in a vehicle to flow therethrough; and a second chiller configured to allow a fluid for cooling a passenger compartment of the vehicle to flow therethrough.

2. The heat exchanger module of claim 1, wherein the control unit is an inverter module electrically connected to the electric compressor through a harness.

3. The heat exchanger module of claim 1, wherein in the control unit, cooling is performed through heat transfer with a fluid transferred to the first chiller or the second chiller.

4. The heat exchanger module of claim 1, wherein the control unit maintains a state of being in surface contact in a horizontal direction with an outer lateral surface of the first chiller.

5. The heat exchanger module of claim 1, wherein the control unit maintains a state of being in surface contact in a horizontal direction with outer lateral surfaces of the first chiller and the second chiller, respectively.

6. The heat exchanger module of claim 1, wherein between the control unit and an outer lateral surface of the first chiller, a heat transfer member is interposed.

7. The heat exchanger module of claim 1, wherein the control unit maintains a state of being in surface contact in a longitudinal direction with outer lateral surfaces of the first chiller and the second chiller, respectively.

8. The heat exchanger module of claim 1, wherein the heat exchanger module further comprises:

a case configured to cover an upper part, and wherein in the case, a connector opening is formed to allow a low voltage connector and a high voltage connector provided in the control unit to be exposed to an outside of the case.

9. The heat exchanger module of claim 8, wherein in the case, a manifold opening is formed so as to allow upper portions of a first manifold and a second manifold to protrude outward.

10. A heat exchanger module comprising:

heat exchanger components;

a manifold configured to provide a flow path for a fluid moving between the heat exchanger components;

a bracket allowing the manifold and the heat exchanger components to be mounted thereon; and an electric compressor, wherein the electric compressor further comprises:

a compression unit configured to compress a refrigerant;

a motor unit configured to provide a driving force;

a control unit on which circuitry components are mounted so as to control the motor unit, and wherein the control unit is installed separatedly from the compression unit and the motor unit, wherein at least some of the heat exchanger components are mounted on the manifold to be directly communicated with the flow path of the manifold, and wherein at least some of remaining heat exchanger components are mounted on a bottom part of the bracket to be fluidly connected to the flow path of the manifold through a hose.

11. A heat exchanger module comprising:

heat exchanger components;

a manifold configured to provide a flow path for a fluid moving between the heat exchanger components;

a bracket allowing the manifold and the heat exchanger components to be mounted thereon; and an electric compressor, wherein the electric compressor further comprises:

a compression unit configured to compress a refrigerant;

a motor unit configured to provide a driving force;

a control unit on which circuitry components are mounted so as to control the motor unit, and wherein the control unit is installed separatedly from the compression unit and the motor unit, wherein among the heat exchanger components, the compression unit, and the motor unit of the electric compressor are disposed on one side of the bracket, and the control unit is disposed on another side of the bracket, wherein the heat exchanger components further comprise:

first components disposed on a same side of the bracket and comprising the compression unit, the motor unit, a water condenser configured to heat exchange with the refrigerant discharged from the electric compressor, and an accumulator;

second components disposed on a same side of the bracket as the control unit, wherein the bracket further comprises:

a bottom part forming a bottom; and a wall part extending upward from the bottom part and forming a wall, wherein the heat exchanger components are dividedly disposed on a front side and a rear side based on the wall part, respectively, and wherein the electrical compressor is disposed in the bottom part, and the second components are disposed in the wall part.

12. The heat exchanger module of claim 11, wherein the manifold further comprises:

a first manifold having a plate shape and in which a first flow path is formed; and a second manifold having a plate shape and in which a second flow path is formed, and wherein the first manifold is coupled to a front surface of the wall part, and the second manifold is coupled to a rear surface of the wall part.

13. The heat exchanger module of claim 12, wherein at least some of the heat exchanger components disposed on the front side based on the wall part are mounted on the first manifold, and wherein at least some of the components disposed on the rear side based on the wall part, comprising a first chiller and a second chiller, are mounted on the second manifold.

14. The heat exchanger module of claim 13, wherein among the heat exchanger components, the water condenser, the accumulator, and the electric compressor are disposed on the front side based on the wall part, and the first chiller and the second chiller are disposed on the rear side based on the wall part, wherein the water condenser and the accumulator are directly mounted on the first manifold, the electric compressor is directly mounted on the bottom part of the bracket, and the first chiller and the second chiller are directly mounted on the second manifold.

15. The heat exchanger module of claim 14, wherein in the first manifold, at least one or more first ports in communication with the first flow path and slightly protruding rearward from a rear surface of the first manifold are provided, and wherein in the wall part and the second manifold, respectively, a pass-through structure passing through the wall part and the second manifold is formed so that the at least one or more first ports are penetrable.

16. The heat exchanger module of claim 15, wherein in the second manifold, at least one or more second ports in communication with the second flow path and slightly protruding rearward from a rear surface of the second manifold are formed, and wherein in the wall part and the first manifold, respectively, a pass-through structure passing through the wall part and the second manifold is formed so that the at least one or more second ports are penetrable.

17. The heat exchanger module of claim 12, wherein in the first manifold, at least one or more first inlets configured to introduce a refrigerant or a coolant from an outside thereinto and at least one or more first outlets configured to discharge the refrigerant or the coolant to the outside are provided, wherein in the second manifold, at least one or more second inlets configured to introduce a refrigerant or a coolant from an outside thereinto and at least one or more second outlets configured to discharge the refrigerant or the coolant to the outside are provided, wherein the at least one or more first inlets and the at least one or more first outlets are positioned in an upper portion of the first manifold, respectively, and wherein the at least one or more second inlets and the at least one or more second outlets are positioned in an upper portion of the second manifold.

* * * * *